(12) United States Patent
Klode

(10) Patent No.: US 8,820,180 B2
(45) Date of Patent: Sep. 2, 2014

(54) MONOLITHIC MAGNETO-STRICTIVE LOAD TRANSDUCER

(75) Inventor: Harald Klode, Centerville, OH (US)

(73) Assignee: Goodrich Corporation, Charlotte, NC (US)

( * ) Notice: Subject to any disclaimer, the term of this patent is extended or adjusted under 35 U.S.C. 154(b) by 752 days.

(21) Appl. No.: 12/627,471

(22) Filed: Nov. 30, 2009

(65) Prior Publication Data

US 2011/0126640 A1 Jun. 2, 2011

(51) Int. Cl.
*G01L 3/00* (2006.01)
(52) U.S. Cl.
USPC ...................................... 73/862.333
(58) Field of Classification Search
USPC ...................... 73/862.331–862.338
See application file for complete search history.

(56) References Cited

U.S. PATENT DOCUMENTS

| | | | |
|---|---|---|---|
| 3,258,962 A | | 7/1966 | Dahle |
| 3,745,448 A | * | 7/1973 | Hiratsuka et al. .......... 73/862.69 |
| 4,048,851 A | * | 9/1977 | Portier ........................ 73/862.69 |
| 4,138,783 A | * | 2/1979 | Portier ............................ 29/606 |
| 4,495,821 A | | 1/1985 | Tehune |
| 4,561,314 A | * | 12/1985 | Alley et al. ................ 73/862.69 |
| 5,419,207 A | | 5/1995 | Kobayashi et al. |
| 6,993,983 B2 | | 2/2006 | Lequesne et al. |
| 7,146,866 B2 | | 12/2006 | Morelli et al. |
| 7,234,361 B2 | | 6/2007 | Lequesne et al. |
| 7,458,276 B2 | * | 12/2008 | Mizuno et al. .................. 73/779 |
| 2006/0086191 A1 | | 4/2006 | Morelli et al. |
| 2007/0096724 A1 | | 5/2007 | Oberdier et al. |
| 2008/0168844 A1 | * | 7/2008 | Lequesne et al. ............... 73/779 |

FOREIGN PATENT DOCUMENTS

| | | |
|---|---|---|
| DE | 2365937 | 11/1972 |
| JP | 2003294191 | 10/2003 |
| SU | 1578536 | 3/1988 |
| SU | 1830467 | 12/1990 |

OTHER PUBLICATIONS

Search and Examination Report dated Dec. 23, 2010 in Application No. GB1015775.8.
GB; Search Report dated Feb. 29, 2012 in Application No. GB1015775.8.
Microminiature, Temperature Compensated, Magnetoelastic Strain Guage, by S.W. Arms & C.P. Townsend, Microstrain, Inc., Burlington, Vermont (2002) (27 pages).

(Continued)

*Primary Examiner* — Lisa Caputo
*Assistant Examiner* — Octavia D. Hollington
(74) *Attorney, Agent, or Firm* — Snell & Wilmer L.L.P.

(57) ABSTRACT

A load sensor is provided comprising a magnetostrictive material and a wire. The magnetostrictive material may comprise an aperture, a first face, a second face, a thickness, and a first dado. The wire is disposed at least partially in the first dado, wherein the first dado at least partially transverses at least one of the first face and the second face, wherein the wire at least partially transverses the first face and the second face. The load sensor may also comprise a magnetostrictive material comprising an aperture, a first face, a second face, a thickness, and a first channel, and a wire disposed at least partially in the first channel, wherein the first channel at least partially transverses at least one of the first face and the second face, wherein the wire at least partially transverses the first face and the second face.

11 Claims, 6 Drawing Sheets

(56) References Cited

OTHER PUBLICATIONS

Exploitation of Inherent Sensor Effects in Magnetostrictive Actuators, by K. Kuhnen, H. Janocha and M. Schommer, Laboratory for Process Automation (LPA), Saarland University, Saarbrucken, Germany (4 pages), (2013).
Development of a Prototype Magnetostrictive Energy Harvesting Device (thesis), by Mark Elliott Staley, Master of Science, 2005 (116 pages).

* cited by examiner

MONOLITHIC MAGNETO-STRICTIVE LOAD TRANSDUCER

TECHNICAL FIELD

The present invention is related to load sensors, load sensing systems, and load sensing methods.

BACKGROUND

In various systems, load sensors are used to detect and quantify a mechanical load. For example, in an aircraft braking system, load sensors may be used to measure a mechanical load. The term mechanical load may generally refer to force, but may also refer to pressure. Of course, as pressure comprises a force distributed over an area, either pressure or force may be determined for a known area of measurement. Accordingly, mechanical load may refer to force, pressure, or both.

Conventional load sensors typically comprise one or more resistance elements that are glued or otherwise affixed to an elastic body such as a steel member. A force generator (such as an actuator) generates force which compresses the steel member, which deforms the resistance element, and thus, changes the electrical resistance of the resistance element. The resistance change may then be interpreted as a load change.

Such sensors must be produced with great care, and often at greater cost, so that the accuracy of the sensor is maintained over a variety of environmental conditions, such as changes in temperature. Further, such sensors typically do not measure load accurately when the load is not applied directly in line with the resistance element.

In addition, conventional sensors have size limitations. Typically, conventional sensors comprise an annular disk and have a diameter to thickness ratio of about three to one. This ratio may be disadvantageous in many applications using a relatively thin sensor, and in applications where excess weight is disfavored, such as in an aircraft. When a load sensor is used with an actuator, longer and/or thicker sensors are generally disfavored as well.

There is a need for a less costly load sensor that supports accurate readings, even where force is not applied uniformly across the sensor. Accordingly, there is a need for a load sensor having an improved diameter to thickness ratio.

SUMMARY

In various embodiments, a load sensor is provided comprising a magnetostrictive material and a wire. The magnetostrictive material comprises an aperture, a first face, a second face, a thickness, and a first dado. The wire is disposed at least partially in the first dado, wherein the first dado at least partially transverses at least one of the first face and the second face, wherein the wire at least partially transverses the first face and the second face.

In various embodiments, a load sensor is provided comprising a magnetostrictive material and a wire. The magnetostrictive material comprises an aperture, a first face, a second face, a thickness, and a first channel. The wire is disposed at least partially in the first channel, wherein the first channel at least partially transverses at least one of the first face and the second face, wherein the wire at least partially transverses the first face and the second face.

In various embodiments, a method is provided comprising applying pressure to a load sensor in electrical communication with an impedance measuring device, and receiving, at the impedance measuring device, at least one of an impedance signal and a resistance signal and measuring the pressure based upon the at least one of an impedance signal and a resistance signal. The load sensor comprises a magnetostrictive material comprising an aperture, a first face, a second face, a thickness, and a first dado, and a wire disposed at least partially in the first dado. The first dado at least partially transverses at least one of the first face and the second face, wherein the wire at least partially transverses the first face and the second face.

DETAILED DESCRIPTION

Figure 1:
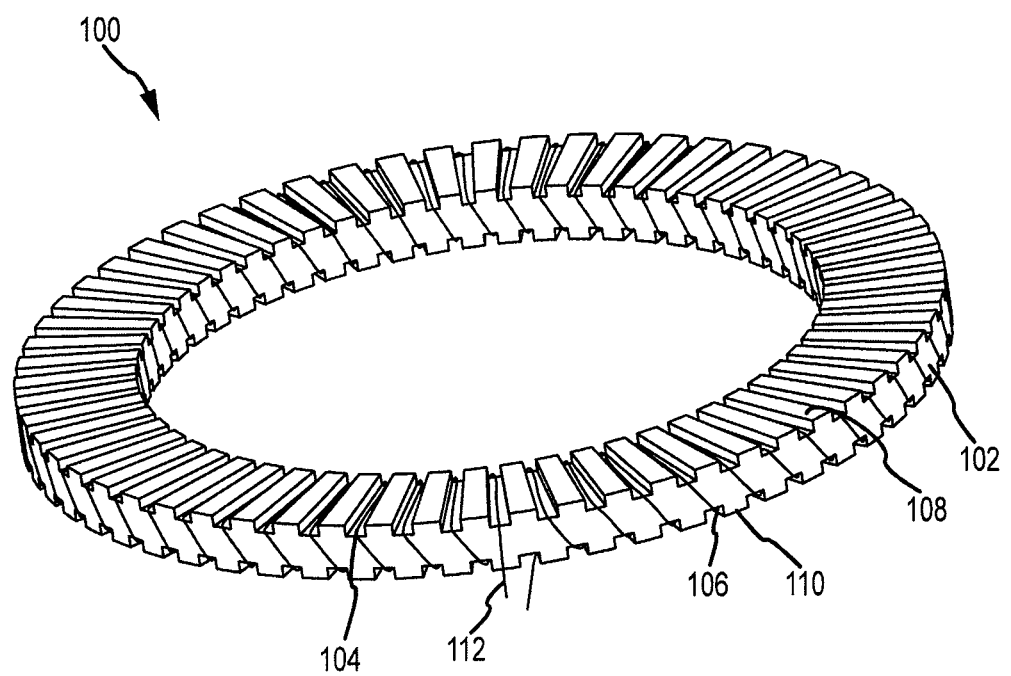
FIG. 1. illustrates a load sensor in an embodiment.

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are disclosed herein for a monolithic load sensor. By using a monolithic design, the load sensor is less susceptible, if at all, to the detrimental secondary effects of sensors made from more than one solid body, such as, for example, assembly stresses, mechanical air gaps, etc., which may affect the accuracy of the sensor. By using a magnetostrictive material, load sensors as disclosed herein are able to be constructed with an improved diameter to height (also referred to as thickness) ratio. Accordingly, a thinner sensor can be achieved relative to conventional load sensors. Also, by using a monolithic design, the location of the load applied to the sensor has little to no effect on the accuracy of the load measurement. Further, there may be additional cost savings realized as the load sensors disclosed herein may be less expensive to manufacture.

As described in further detail below, a monolithic load sensor may be constructed of a magnetostrictive material and monitored for changes in magnetic flux in response to a mechanical load. More specifically, for a given magnetostrictive material, the relationship between mechanical load and magnetic flux is known, so load may be determined from the measurement of magnetic flux. Similarly, as operation temperature is typically known at the time of load measurement, any effects of temperature may be accounted for during use. Further, monolithic load sensors as described herein are better able to accommodate imperfections in the surfaces with which they interact. Accordingly, monolithic load sensors as described herein tend to be simple, accurate, robust, and inexpensive to manufacture.

As noted above, a mechanical load may comprise the application of force or pressure. As pressure comprises a force over an area, the terms force and pressure may be used interchangeably herein, although the relationship between force and pressure is well understood and it is known that one may derive force from pressure and pressure from force for a given area. A mechanical load may also be referred to as a compressive force or a compression force.

As used herein, "magnetostrictive materials" comprise materials whose magnetic susceptibility change in response to mechanical stress. Accordingly, a change in magnetic susceptibility causes a change in magnetic flux. This change in magnetic susceptibility in response to mechanical stress is known as the Villari effect. Because of this relationship, one may determine a force applied to a material if one has measured the change in magnetic flux.

In various embodiments, magnetostrictive materials may be selected or configured so that the magnetostrictive material may be mechanically stiff in the direction of the applied force or pressure but also flexible in a plane perpendicular to the applied force of pressure.

Many ferromagnetic materials are magnetostrictive materials. For example, alloys comprising iron and/or iron and nickel may be magnetostrictive materials. For example, an alloy comprising Ni 41-43.5%, Cr 4.9-5.75%, Ti 2.2-2.75%, and Fe 48% may be a magnetostrictive material suitable for use in the systems and methods disclosed herein. Such an alloy is obtainable commercially under the name NI-SPAN-C® from Special Metals Corporation, Huntington, W. Va., USA. For example, NI-SPAN-C® may comprise: Nickel (plus Cobalt) 41.0%-43.5%, Chromium 4.9%0-5.75%, Titanium 2.20%-2.75%, Aluminum, 0.30%-0.80%, Carbon 0.06% max, Manganese 0.80% max, Silicon 1.00% max, Sulfur 0.04% max, Phosphorus 0.04% max, and Iron (balance) %.

With reference to FIG. 1, magnetostrictive material 100 is illustrated. In this embodiment, magnetostrictive material 100 comprises a nickel-iron alloy, although magnetostrictive material 100 may be any suitable magnetostrictive material. Magnetostrictive material 100 is shaped as an annular disk, although a load sensor may take any shape that has at least one aperture. For example, a magnetostrictive material may take the form of a square, rectangle, triangle, hexagon, octagon, an irregular shape, or any other known shape. In various embodiments, for example, a magnetostrictive material may take the form of an O-ring. Furthermore, the sensor may use magnetostrictive material that takes the form of a layer or a coating applied substantially uniformly over a sensor body comprised of non-magnetostrictive or magnetically inert material, such as, for example, non-magnetic stainless steel, a ceramic material, or the like.

In various embodiments, a magnetostrictive material has a first face and a second face. The first face and the second face may comprise any area of a magnetostrictive material that is intended or configured to be subjected to a mechanical load. Magnetostrictive material 100 comprises first face 108 and second face 110. First face 108 and second face 110 may comprise any area of magnetostrictive material 100 that is intended to be subjected to a mechanical load. First face 108 and second face 110 are substantially flat, although in various embodiments a first face and a second face may be rounded or otherwise configured as other than substantially flat. First face 108 and second face 110 are also substantially smooth, although in various embodiments a first face and a second face may be rough.

A magnetostrictive material may be formed in a variety of thicknesses. Thickness, as used herein, may be measured as the distance from the first face to the second face. For example, in various embodiments, a magnetostrictive material may have a thickness from about 0.5 mm to about 10 mm and, in various embodiments, a magnetostrictive material may have a thickness from about 3 mm to about 5 mm With reference to FIG. 1, magnetostrictive material 100 has a thickness from about 3 mm to about 5 mm.

A magnetostrictive material may be formed in a variety of lengths and widths or, in the case of cylindrical shapes, a variety of diameters. Any suitable inside or outside diameter may be used. An inside and/or outside diameter may be selected based upon the intended size of the final sensor, the type and size of the conductive path (as described in more detail herein) and other like factors.

For example, a magnetostrictive material of an annular shape may have an outside diameter of between about 10 mm to about 10 cm. In various embodiments where a smaller sensor is desired, an outside diameter of about 25 mm to about 1 cm may be used. In further embodiments where small, lightweight sensors are desirable, an outside diameter of about 50 mm to about 100 mm may be appropriate. For example, magnetostrictive material 100 shown in FIG. 1 has an outside diameter of about 50 mm to about 100 mm.

The selection of an inside diameter may be dependent upon selection of an outside diameter and other like factors. For example, a magnetostrictive material may have an inside diameter that is about 2 mm to about 9.5 cm less than the outside diameter, although any suitable inside diameter is contemplated. For example, a magnetostrictive material may have an inside diameter of between about 8 mm to about 9.8 cm. In further embodiments, a magnetostrictive material may have an inside diameter of about 23 mm to about 0.98 cm where smaller sensors are desired. In still further embodiments, an inside diameter of about 48 mm to about 98 mm is desirable to achieve a small sensor size. In another embodiment, a magnetostrictive material comprises an outside diameter of about 65 mm, an inside diameter of about 50 mm, and a thickness of about 2.5 mm.

Figure 2:
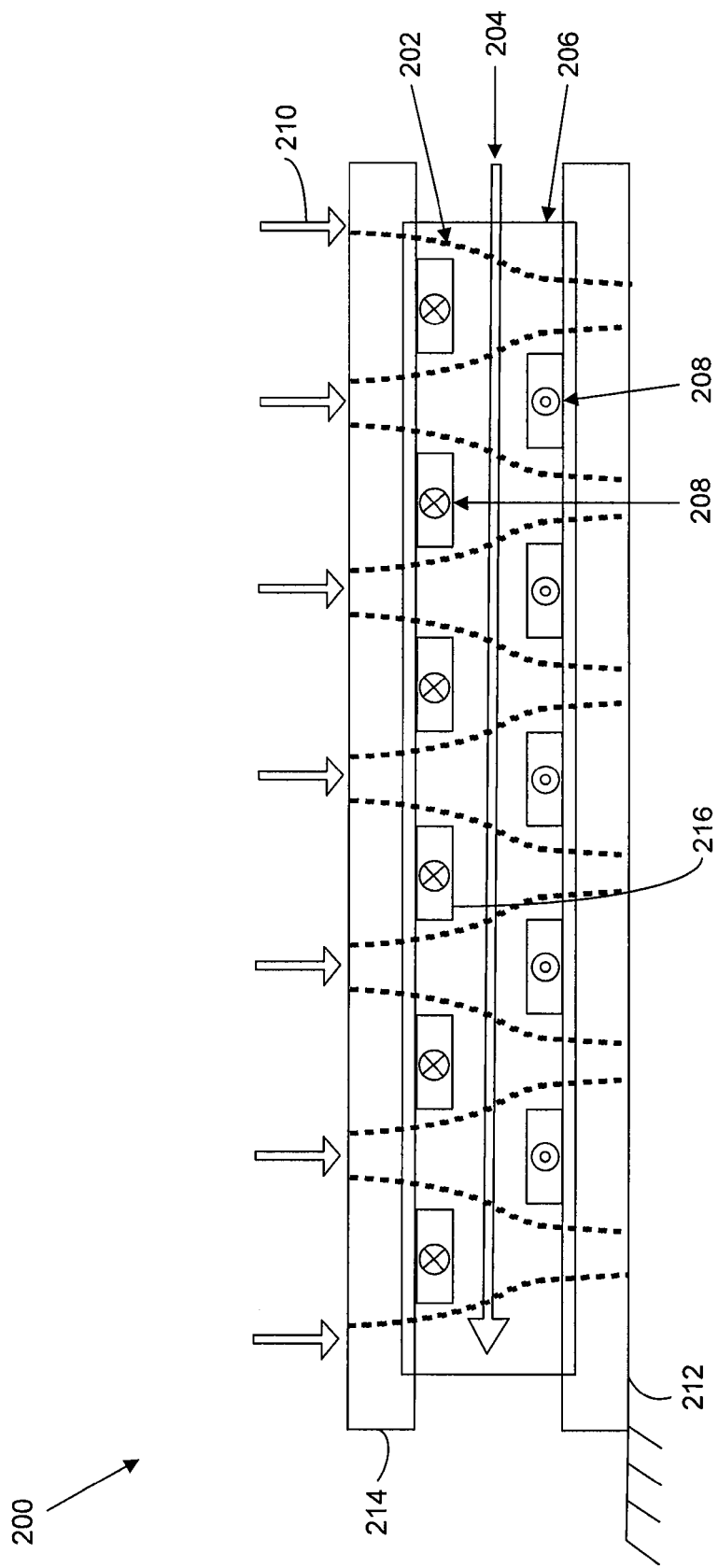
FIG. 2 illustrates a load sensor in an embodiment in cross section.

In various embodiments, with momentary reference to FIG. 2, a first face and a second face may be in mechanical communication with a distributor plate, such as illustrated by distributor plates 214 and 212. A distributor plate may be comprised of any suitable non-ferromagnetic material, such as non-ferromagnetic metal, plastic, or composite material. In various embodiments, a distributor plate is configured to withstand the intended operating loads. For example, in various embodiments, a load sensor may detect from about 200 lbs/in$^2$ to about 10,000 lbs/in$^2$ and accordingly, in various embodiments, the distributor plate may be configured to withstand loads within such a range.

In various embodiments, a magnetostrictive material has dadoes or grooves machined, stamped, or otherwise disposed into it. Dadoes or grooves may comprise a quadrilateral shape, they may be of a rounded "U" shape, or any other suitable shape, which, as described below, would be capable of receiving a wire or other conductive material. With reference back to FIG. 1, magnetostrictive material 100 has dado 104 and dado 106. Dado 104 and dado 106 are machined, stamped, or otherwise disposed into magnetostrictive material 100 such that each of dado 104 and dado 106 comprises a lower surface and two side surfaces. The lower surface of each dado 104 and dado 106 is below first face 108 and second face 110. The width of a dado may be measured as the distance between each side surface.

Each of dado 104 and dado 106 is wide enough to accommodate wire 112 such that wire 112 may be wrapped around magnetostrictive material 100 such that a toroidal coil may be formed. For example, a dado may have a width of about 0.1 mm to about 2 mm. Dado 104 and dado 106 have widths of about 0.5 mm to about 0.8 mm. There may be any suitable number of dadoes in a magnetostrictive material. The number of dadoes may be selected based upon, in part, the size of the magnetostrictive material. For example, in general, larger magnetostrictive materials may benefit from a greater number of dadoes. For example, in various embodiments, a magnetostrictive material 100 may have between about 2 and about 5000 dadoes. In other embodiments, between about 10 to about 400 dadoes may be appropriate. In other embodiments, including embodiments having outside diameters of less than 100 mm, between about 60 to about 100 dadoes may be appropriate.

The lower surface and/or each side surface of each dado 104 and dado 106 may have an insulating material disposed on it. The insulating material comprises any material that has electrically insulating properties. For example, in various embodiments, insulating materials comprise acetal resins (e.g., DELRIN), epoxies, acrylics, fiberglass sheet materials, polyimide films (e.g., KAPTON), polycarbonates (e.g., LEXAN), polyamides (e.g., NOMEX) and chemically or mechanically deposited ceramic materials. In various embodiments, the insulating material is used to electrically insulate the magnetostrictive material from a conductive material. The insulating material may be taped, glued, pressed, or otherwise affixed to each lower surface and/or each side surface of each dado 104 and dado 106. For example, chemical vapor deposition ("CVD") may be used to deposit an insulating material in each dado 104 and dado 106.

In various embodiments, a magnetostrictive material comprises a continuous portion of magnetostrictive material. For example, continuous portion 102 of magnetostrictive material 100 is continuous throughout the annular structure of magnetostrictive material 100. A continuous portion of magnetostrictive material conducts a magnetic flux which, as described herein, may be measured to evaluate or determine a mechanical load.

In various embodiments, a continuous conductive path around or through the magnetostrictive material may be established. For example, a wire may be used to establish a continuous conductive path around or through the magnetostrictive material.

In various embodiments, magnetostrictive material 100 is coupled with wire 112. For example, a continuous conductive path around a magnetostrictive material may be established by the deposit of a metal onto magnetostrictive material, such as by chemical vapor deposition. Alternatively, a continuous conductive path around a magnetostrictive material may be established by pressing a metal ribbon or other conductive material around the magnetostrictive material.

A wire may be made of any conductive material, such as a metal. For example, wire 112 is copper. A wire may be sheathed in an insulating sleeve, although in various embodiments a wire need not be sheathed in an insulating sleeve. A wire may be configured as a single wound wire or a bifilar wound wire. For example, with reference to FIG. 1, wire 112 is bifilar wound.

Wire 112 wraps around magnetostrictive material by traversing the length of each dado, traversing the thickness of magnetostrictive material 100, and traversing a dado on the opposite side of the magnetostrictive material 100. For example, as shown in FIG. 1, wire 112 traverses dado 104, traverses the thickness of magnetostrictive material 100, and traverses dado 106.

In various embodiments, a conductive path, such as wire 112, may be in electrical communication with one or more electronic components. For example, a conductive path may be in electrical communication with a device that is configured to measure at least one of inductance, inductance/voltage, resistance, impedance, and phase. For example, a voltage analyzer, inductance analyzer, phase analyzer or impedance analyzer may be capable of measuring inductance and/or inductance/voltage, resistance, impedance, or phase. A phase measurement may comprise the comparison of two or more characteristic events associated with inductance and resistance. The use of both alternating current (AC) and direct current (DC) is contemplated for use in various embodiments. Although not shown in FIG. 1, wire 112 may be in communication with an electronic component such as a voltage analyzer or an inductance measuring device.

In various embodiments, a conductive path, such as wire 112, carries an inductance signal comprising an inductance level. Alternatively, in various embodiments, a conductive path, such as wire 112, may carry a voltage signal comprising a voltage level.

In various embodiments, a voltage analyzer and/or an inductance measuring device and/or an impedance measuring device and/or phase measuring device comprises a device comprising a processor which may be associated with a memory. For example, a voltage analyzer and/or an inductance measuring device and/or an impedance measuring device and/or phase measuring device may be any device that may sense, measure, or detect voltage, phase, impedance, and/or inductance. In further embodiments, a voltage analyzer and/or an inductance measuring device and/or an impedance measuring device and/or phase measuring device may comprise other devices for the calculation of mechanical load based upon a change in output voltage, impedance and/or output inductance/voltage. In embodiments comprising a memory, the memory may comprise a computer-readable medium having instructions stored thereon that, if executed by a computing device (e.g., a processor), cause the computing device to perform a method comprising any of the methods described herein.

As described above, a magnetostrictive material's magnetic susceptibility changes in response to the application of a mechanical load and thus a change in magnetic flux may occur. Accordingly, measuring inductance using a conductive path will reflect the change in magnetic flux.

For example, with reference now to FIG. 2, load sensor 200 is shown in cross section. Top distributor plate 214 and bottom distributor plate 212 are in mechanical communication with magnetostrictive material 206. Mechanical load 210 is applied to top distributor plate 214. A mechanical stress pattern 202 arises responsive to mechanical load 210. Wire 208 is disposed in the dadoes of magnetostrictive material 206.

When a current is passed through wire 208, magnetic flux 204 arises. In various embodiments, each dado of magnetostrictive material 206 has a bottom surface that is greater than about one half the thickness of magnetostrictive material 206. In various embodiments, the depth and width of each dado may be controlled to adjust the stiffness and/or flexibility of the magnetostrictive material. The number of dadoes in the magnetostrictive material may also be controlled to adjust the magnetic interaction between the magnetostrictive material and the conductive material, such as a wire. In such embodiments, magnetic flux 204 travels through a continuous portion of magnetostrictive material 206. However, in various embodiments, a continuous portion of magnetostrictive material may not exist. In various embodiments, a dado in a magnetostrictive material has a depth greater than one half the thickness of the magnetostrictive material.

As mechanical load 210 increases, the magnetic flux through magnetostrictive material 206 may change. The inductance in wire 208 reflects the change in magnetic flux. The change in magnetic flux may be correlated, mapped, or associated with mechanical load 210, such that the value of the mechanical load may be determined using the change in inductance.

Figure 3:
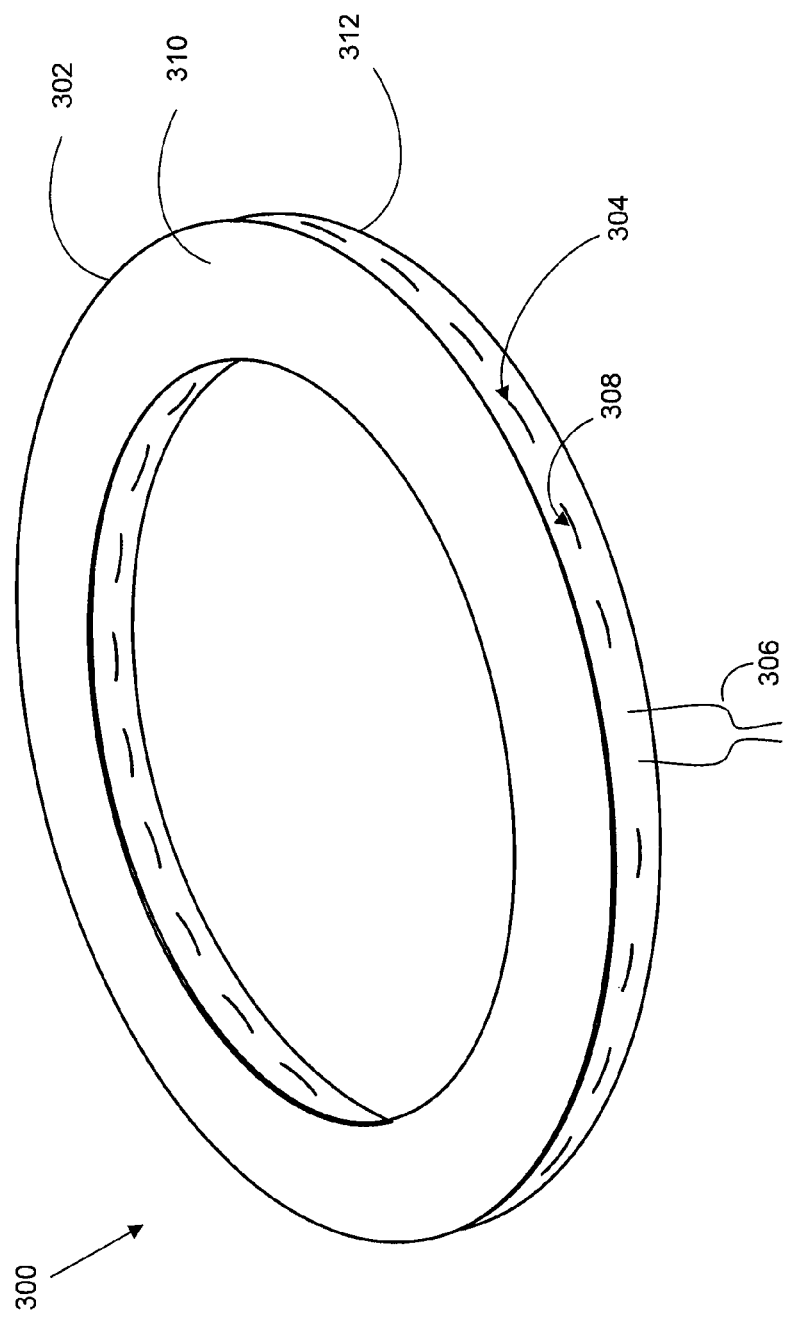
FIG. 3 illustrates a load sensor in a further embodiment.

Referring now to FIG. 3, a load sensor 300 is shown in accordance with various embodiments. As discussed above, in various embodiments, a conductive path is established within magnetostrictive material 302 and may be used to measure a change in magnetic flux responsive to a mechanical load. Magnetostrictive material 302 is formed as an annular ring. Magnetostrictive material 302 has first face 310 and second face 312. First face 310 and second face 312 may have a smooth surface or a rough surface and, in various embodiments, may be configured such that they are not substantially flat. For example, first face 310 and second face 312 may be curved or rounded.

In various embodiments, channel 304 traverses magnetostrictive material 302 between the outer diameter to the inner diameter. Channel 304 may be formed by drilling, machining, etching, or otherwise boring through magnetostrictive material 302 along a radius of magnetostrictive material 302.

In various embodiments, channel 304 may be coated with any insulating material disclosed herein (not shown). For example, channel 304 may have an insulating material deposited by CVD.

In various embodiments, a conductive path may be established on or in magnetostrictive material 302, as described herein. For example, wire 308 traverses channel 304. Wire 308 forms a conductive path beginning and ending at junction 306. Further devices, as described herein, may couple to wire 308 at junction 306 to perform measurement functions.

Figure 4:
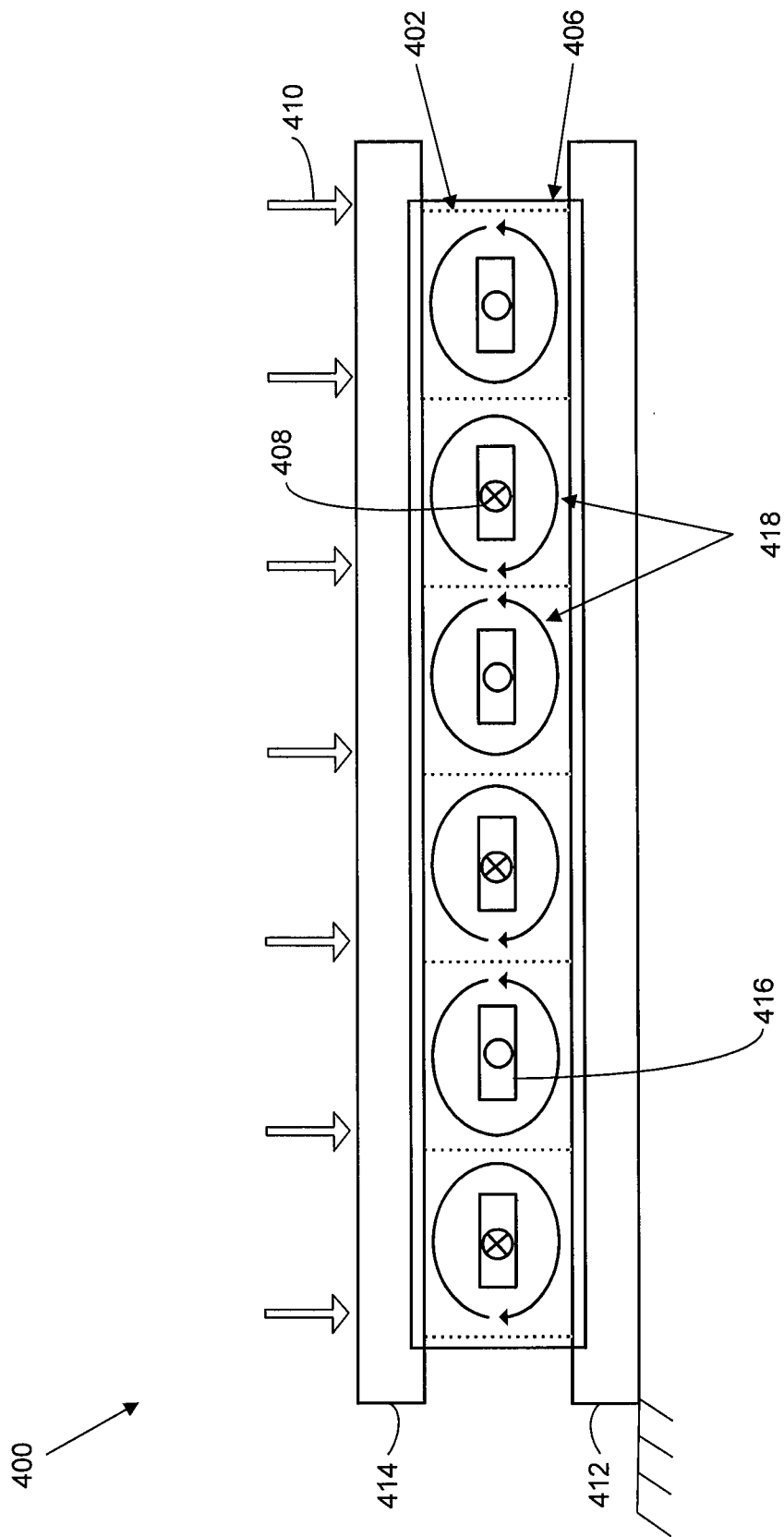
FIG. 4 illustrates a load sensor in a further embodiment in cross section.

With reference now to FIG. 4, a cross section of load sensor 400 is shown. In various embodiments, top distributor plate 414 and bottom distributor plate 412 are in mechanical communication with magnetostrictive material 406. Mechanical load 410 is applied to top distributor plate 414. Mechanical stress pattern 402 arises responsive to mechanical load 410. Wire 408 is disposed in the channels of magnetostrictive material 406 (a single channel is shown as channel 416).

When a current is passed through wire 408, magnetic flux 418 arises. In various embodiments, magnetic flux 418 travels through a continuous portion of magnetostrictive material 406. For example, magnetic flux 418 is shown in cross section as traveling in an approximately circular direction. In various embodiments, channel 416 in a magnetostrictive material 406 has an insulating material disposed in it to electrically insulate wire 408 and magnetostrictive material 406.

As mechanical load 410 increases, the magnetic flux through magnetostrictive material 406 may change. The inductance in wire 408 reflects the change in magnetic flux. The change in magnetic flux 404 may be correlated, mapped, or associated with mechanical load 410, such that the value of the mechanical load may be determined using the change in inductance.

Figure 5:
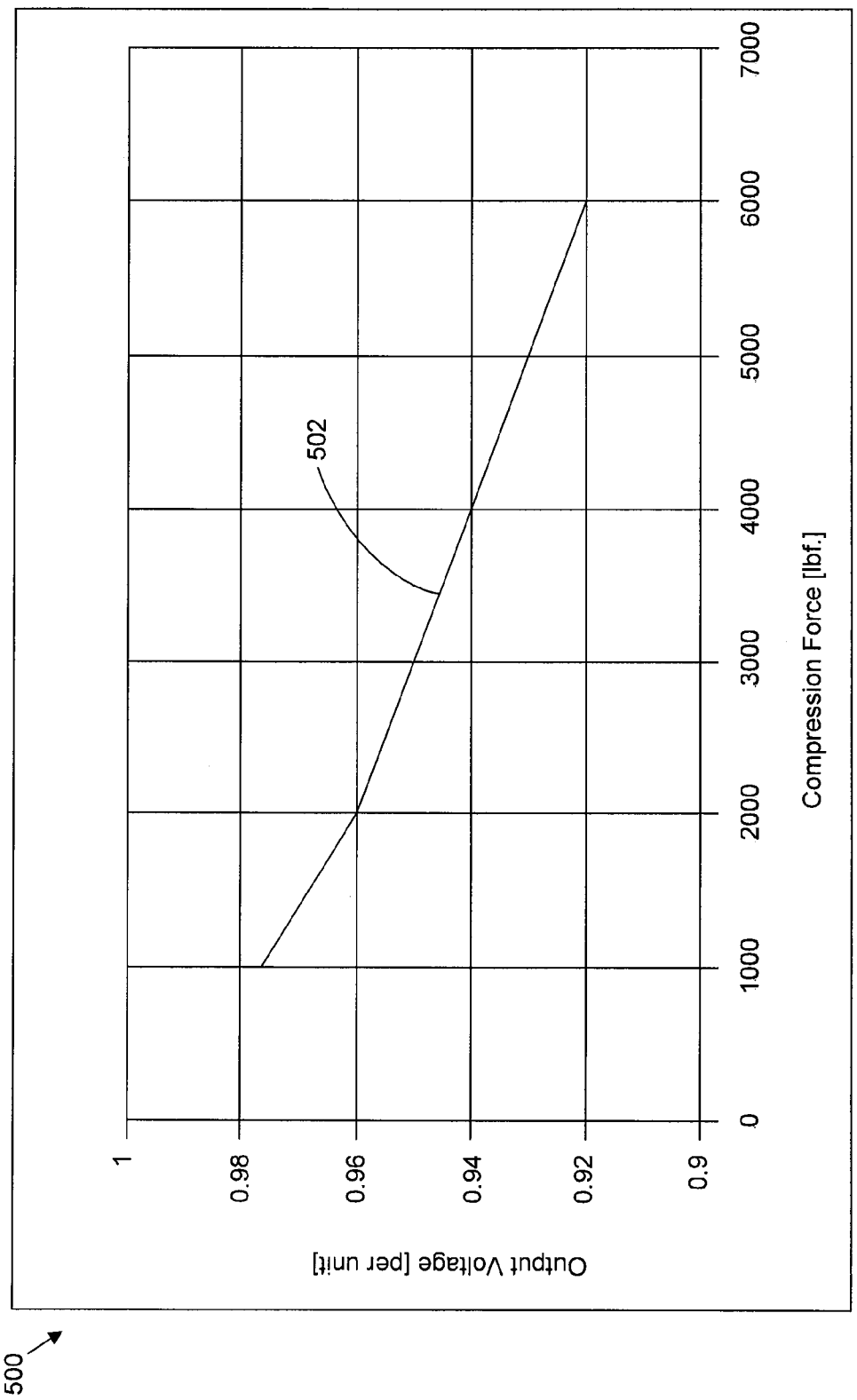
FIG. 5 illustrates an inductance to force relationship.

With reference now to FIG. 5, a sample relationship of mechanical load (referred to as compression force) versus output voltage is illustrated. As shown by line 502, as compression force increases, output voltage decreases. Using this relationship, an output voltage may be mapped, correlated, or associated with a compression force. That being noted, it is understood that FIG. 5 illustrates an example only, and that many relationships between mechanical load and output voltage may be found empirically.

As briefly mentioned above, the relationship between mechanical load and output inductance/voltage/resistance/impedance may vary with temperature. Thus, in various embodiments, temperature (whether ambient temperature of the temperature of any component of a load sensor) is taken into account when determining mechanical load from either output inductance/voltage or output voltage. In particular, in various embodiments, the temperature of the magnetostrictive material is taken into account when determining mechanical load from either output inductance/voltage. Such adjustment for temperature varies depending on the properties of the magnetostrictive material used, among other variables. In various embodiments, load sensors further comprise systems and methods to measure operating temperature and to compensate for temperature effects.

Figure 6:
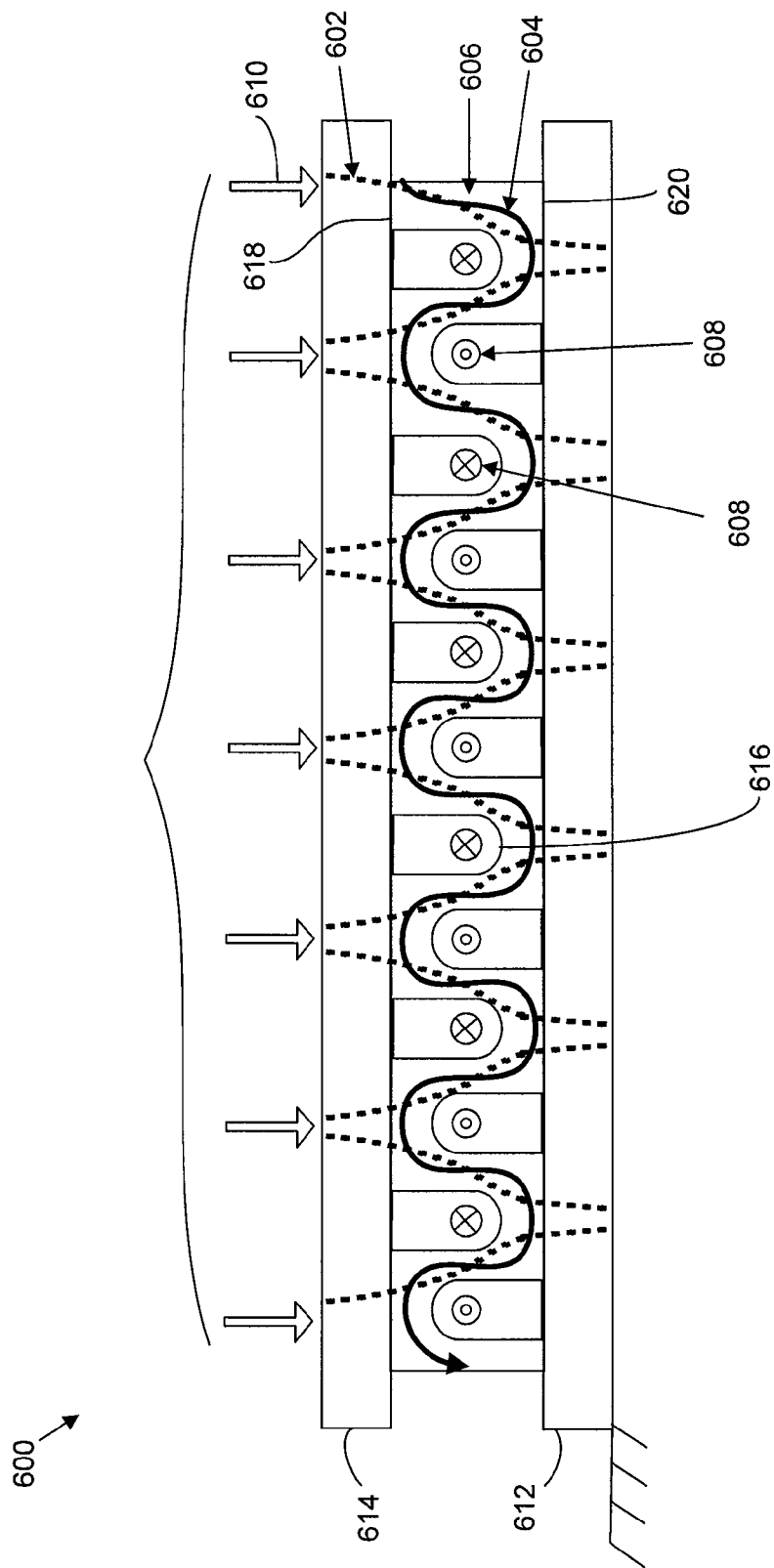
FIG. 6 illustrates a load sensor in a further embodiment in cross section.

In various embodiments, with reference to FIG. 6, magnetostrictive material 600 is illustrated in cross section. Magnetostrictive material 606 comprises a nickel-iron alloy. Magnetostrictive material 606 is shaped as an annular disk. Magnetostrictive material 606 has first face 618 and second face 620. As disclosed herein, first face 618 and second face 620 may comprise any area of magnetostrictive material 606 that is intended to be subjected to a mechanical load. First face 618 and second face 620 are substantially flat, although in various embodiments a first face and a second face may be rounded or otherwise configured to be not substantially flat. First face 618 and second face 620 are also substantially smooth, although in various embodiments a first face and a second face may be rough.

In various embodiments, first face 618 and second face 620 may be in mechanical communication with one or more distributor plates. For example, distributor plate 614 is in mechanical communication with first face 618 and distributor plate 612 is in mechanical contact with second face 620.

In various embodiments, magnetostrictive material 606 has dadoes or grooves machined, stamped, or otherwise disposed into it. Magnetostrictive material 606 has groove 616. Groove 616 has a rounded "U" shape when viewed from a cross section. Groove 616 may be machined, stamped, or otherwise disposed into magnetostrictive material 606 in any suitable manner. Groove 616 is wide enough to accommodate wire 608 such that wire 608 may be wrapped around magnetostrictive material 606. For example, a groove 616 may have a width of about 0.1 mm to about 2 mm and/or about 0.5 mm to about 0.8 mm.

The lower surface and/or each side surface of groove 616 may have an insulating material disposed on it. The insulating material may comprise a material that has electrically insulating properties. The insulating material may be taped, glued, pressed, or otherwise affixed any portion of any surface of groove 616. For example, chemical vapor deposition ("CVD") may be used to deposit an insulating material into groove 616.

Although in various embodiments, a magnetostrictive material comprises a continuous portion of magnetostrictive material in a plane, in magnetostrictive material 606, there is no continuous portion of magnetostrictive material in a plane. Magnetic flux 604 is conducted through a continuous portion of magnetostrictive material 606, as shown, although the continuous portion of magnetostrictive material 606 is not in a single plane.

In various embodiments, a continuous conductive path around magnetostrictive material 606 may be established. For example, magnetostrictive material 606 is coupled with wire 608. A wire may be made of any conductive material disclosed herein or otherwise known. For example, wire 608 is copper.

Wire 608 wraps around magnetostrictive material 606 by traversing the length of each groove, such as groove 616, traversing the thickness of magnetostrictive material 606, and traversing a groove on the opposite side of the magnetostrictive material 606. For example, wire 608 traverses groove 616, traverses the thickness of magnetostrictive material 606, and traverses a groove adjacent to groove 616.

In various embodiments, a conductive path, such as wire 608, may be in electrical communication with one or more electronic components as described herein. Although not shown in FIG. 6, wire 608 may be in communication with an electronic component such as a voltage analyzer.

In various embodiments, top distributor plate 614 and bottom distributor plate 612 are in mechanical communication with magnetostrictive material 606. Mechanical load 610 is applied to top distributor plate 614. Mechanical stress pattern 602 arises responsive to mechanical load 610. Wire 608 is disposed in the grooves of magnetostrictive material 606.

When a current is passed through wire 608, magnetic flux 604 arises. In various embodiments, magnetic flux 604 travels through a continuous portion of magnetostrictive material 606, although continuous portion of magnetostrictive material 606 is not in a single plane. In various embodiments, groove 616 in a magnetostrictive material 606 has a depth greater than about one half the thickness of magnetostrictive material 606.

As mechanical load 610 increases, the magnetic flux through magnetostrictive material 606 may change. The inductance in wire 608 may reflect the change in magnetic flux. The change in magnetic flux 604 may be correlated, mapped, or associated with mechanical load 610, such that the value of the mechanical load may be determined using the change in inductance.

In various embodiments, load sensors as disclosed herein may be used in aircraft braking systems. In particular, load sensors may be used to measure actuator loads. Accordingly, a load sensor may be placed in the load path of an electromechanical brake actuator. In various embodiments, load sensors as disclosed herein may be useful in applications where forces that are spread over a larger (often, annular) area. Further, in various embodiments, load sensors as disclosed herein may be useful in applications in which the applied force is unevenly distributed across the sensor's surface area and/or the sensor support is not perfectly flat.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A load sensor comprising;
a magnetostrictive material having an axis and comprising a central aperture having an axis, a first face, a second face, a thickness, an outer surface, and a first dado, wherein the central aperture is bounded by an inner surface of the magnetostrictive material; and
a conductive path disposed at least partially in the first dado;
wherein the first dado runs perpendicular to the axis and extends from the outer surface to the inner surface, wherein the first dado at least partially transverses and disrupts at least one of the first face and the second face, wherein the conductive path at least partially transverses the first face and the second face.

2. The load sensor of claim 1, wherein the magnetostrictive material comprises a nickel-iron alloy.

3. The load sensor of claim 1, wherein the magnetostrictive material is configured as an annular disk.

4. The load sensor of claim 1, further comprising an impedance measuring device in electrical communication with the conductive path.

5. The load sensor of claim 4, wherein the impedance measuring device is configured to determine an amount of a force applied to at least one of the first face and second face based upon impedance.

6. The load sensor of claim 5, wherein the impedance measuring device is configured to determine the amount of a force applied to only a portion of the first face and second face based upon impedance.

7. The load sensor of claim 1, further comprising a second dado that at least partially transverses the second face.

8. The load sensor of claim 6, wherein the conductive path is at least partially disposed in the second dado.

9. The load sensor of claim 1, wherein the magnetostrictive material is continuous within a plane perpendicular to the conductive path.

10. The load sensor of claim 1, wherein the conductive path comprises a wire.

11. The load sensor of claim 1, further comprising a plurality of dadoes.

* * * * *